Patented Sept. 7, 1937

2,092,229

UNITED STATES PATENT OFFICE 2,092,229

NITROCELLULOSE LACQUER

Kurt Thinius, Eilenburg, Germany, assignor to Deutsche Celluloid-Fabrik, Eilenburg in Saxony, Germany No Drawing. Application October 30, 1934, Serial No. 750,741. In Germany November 4, 1933

4 Claims. (Cl. 134—79)

My present invention relates to the manufacture of nitrocellulose lacquers.

One of its objects is to provide an improved nitrocellulose lacquer. Further objects will be seen from the detailed specification following hereafter.

Commercial collodion cottons include degrees of esterification of 60 up to 80 per cent. of the hydroxyl groups in the cellulose which are capable of being esterified; such degrees of esterification correspond with a nitrogen content from 10.4 per cent. up to 12.5 per cent. According to the degree of esterification the solubility of the commercial collodion cotton varies in individual solvents and mixtures of solvents. As is known, solvents exist which disperse practically the whole range of nitrocellulose to more or less completely colloidal solutions, whereas other solvents or mixtures of solvents dissolve only nitrocellulose of a certain degree of esterification. For classifying nitrocellulose in respect of their solubility, it was the early practice to base the classification on the behavior of the material to ethyl alcohol of the usual commercial concentration (94.6 per cent. $C_2H_5OH$). There were distinguished the cottons soluble in somewhat high degree in this alcohol having a degree of esterification of 60 to 66 per cent., and those cottons which are only slightly soluble and have a high degree of esterification (up to 80 per cent.): compare Bianchi-Weihe: Cellulose-ester lacquer, 1931, page 48. Use of the so-called "alcohol-soluble cottons" for making cheap lacquers from a mixture of spirit and aromatic hydrocarbons, particularly benzene, with addition of fluxing agents and the usual softeners has long been known. These lacquers do not comprise any true solvent. Nevertheless, these cheap ester-free alcoholic nitrocellulose lacquers yield on evaporation of the solvent an unobjectionable layer. It has not hitherto been possible to transfer this way of manufacture to the ester-soluble nitrocellulose of high degree of esterification, which excel the lower nitrated alcohol-soluble (94.6 per cent. $C_2H_5OH$) collodion cotton in many respects, but principally in the tensile strength of the film produced by them. For making practicable lacquers with ester-soluble cotton as the basis it has hitherto been necessary that the lacquer should contain 25 to 40 per cent. of a true solvent, (compare, Bianchi-Weihe, page 262 et seq.).

The present invention relates to the manufacture of nitrocellulose lacquers from the so-called ester-soluble highly nitrated cottons of a degree of esterification of 70 to 75 per cent. only using as solvents the absolute alcohol (100–98.9 per cent.) with the addition of aromatic hydrocarbons, particularly benzene; the lacquers do not need any true solvent for the production of unobjectionable layers. The proportion of aromatic hydrocarbon, particularly benzene, used in making lacquers in accordance with the invention may vary between 2.5 per cent. and 45 per cent. of the lacquer; however, the preferred composition for the lacquer is one in which the latter contains equal parts by weight of absolute alcohol and benzene. By evaporating such a lacquer which, besides anhydrous alcohol, benzene and softener, contains no true solvent, there is obtained the ester-soluble nitrocellulose in the form of a transparent film which is practically free from objection. A lacquer which, instead of highly nitrated ester-soluble cotton, which advantageously contains between 11.8 and 11.9 per cent. of nitrogen, contains a so-called alcohol-soluble cotton of a lower degree of nitration (N=10.6–10.8 per cent.), in the same solvent mixture leaves on evaporation under the same atmospheric conditions a "white" film, which is not useful as a commercial lacquer.

For improving the flowing of the lacquer made from an ester-soluble collodion cotton with absolute alcohol and benzene as the solvent, there may be added a small proportion of a true solvent of medium boiling point that is to say between about 120 to 160° C. The surprising observation has been made that the addition of true solvent, for example butyl acetate, must not exceed a certain low percentage of the lacquer. The proportion depends on the kind of solvent. In no case, however may it exceed 4 per cent. of the lacquer, as otherwise the film would be "white". This fact could not be foreseen because the general rule is that by raising the proportion of true solvent the tendency to the formation of a clear film is increased. In contrast, it has been ascertained that when the highest possible proportion of true solvent added to an anhydrous mixture of alcohol and benzene has been exceeded a precipitation of the ester-soluble nitrocellulose occurs during the evaporation of the solvent, which can only be avoided if the proportion of true solvent is so high that alcohol and benzene act only as diluents.

The following examples illustrate the invention:

Example 1

The following is a prescription for a Zapon lacquer:

- 7.5 per cent. of nitrocellulose moistened with butyl alcohol or ethyl alcohol to the extent of 35 per cent. (high viscosity N=11.62 per cent.).
- 91.5 per cent. of absolute alcohol+benzene 1:1,
- 1 per cent. of dibutyl phthalate.

Example 2

The following is a prescription for dipping lacquers:

- 13.5 per cent. of nitrocellulose moistened with butyl alcohol or ethyl alcohol to the extent of 35 per cent. (middle viscosity N=11.80 per cent.),
- 2.5 per cent. of tricresyl phosphate C II S,
- 81.0 per cent. of absolute alcohol+benzene 1:1,
- 3.0 per cent of butyl acetate.

Example 3

- 13.5 per cent. of nitrocellulose moistened with butanol to the extent of 35 per cent. (middle viscosity N=11.80 per cent.)
- 2.5 per cent. of dibutyl phthalate,
- 82.0 per cent. of absolute alcohol + benzene 1:1,
- 2.0 per cent. of ethylglycolacetate.

Example 4

- 10 per cent. of dry nitrocellulose (middle viscosity N=11.85)
- 83 per cent. of absolute alcohol,
- 2.5 per cent. of benzene,
- 2.0 per cent. of ethylglycolacetate,
- 2.5 per cent. of dibutyl phthalate.

What I claim is:

1. A clear drying nitrocellulose lacquer comprising nitrocellulose containing 11.5 to 11.9 per cent of nitrogen and moistened with alcohol containing a small quantity of a softener and as the sole low boiling solvent a mixture consisting of at least 50 per cent of absolute alcohol and at most 4 per cent of a true solvent for the nitrocellulose of a boiling point between about 120 to 160°, the balance being benzene or its homologues.

2. A clear drying nitrocellulose lacquer comprising nitrocellulose containing 11.5 to 11.9 per cent of nitrogen and moistened with alcohol containing a small quantity of tricresyl phosphate and as the sole low boiling solvent a mixture consisting of equal parts of absolute alcohol and benzene or its homologues and about 3.7 per cent of butyl acetate.

3. A clear drying nitrocellulose lacquer comprising nitrocellulose containing 11.5 to 11.9 per cent of nitrogen and moistened with butanol containing a small quantity of dibutyl-phthalate and as the sole low boiling solvent a mixture consisting of equal parts of absolute alcohol and benzene or its homologues and about 2.5 per cent of ethyl glycol acetate.

4. A clear drying nitrocellulose lacquer comprising nitrocellulose containing 11.5 to 11.9 per cent of nitrogen containing a small quantity of dibutyl phthalate and as the sole low boiling solvent a mixture consisting of 83 parts of absolute alcohol, 2.5 parts of benzene and about 2.5 parts of ethyl-glycol-acetate.

KURT THINIUS.